US008332480B2

(12) United States Patent
Ohta (10) Patent No.: US 8,332,480 B2
(45) Date of Patent: Dec. 11, 2012

(54) STORAGE SYSTEM

(75) Inventor: Mitsuhiko Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 23 days.

(21) Appl. No.: 11/510,984

(22) Filed: Aug. 28, 2006

(65) Prior Publication Data

US 2007/0204023 A1    Aug. 30, 2007

(30) Foreign Application Priority Data

Feb. 24, 2006  (JP) .................................. 2006-048597

(51) Int. Cl.
*G06F 15/16* (2006.01)
(52) U.S. Cl. ........................................................ 709/217
(58) Field of Classification Search ................ 709/203, 709/217, 225, 229, 202, 208–211, 213–216, 709/219
See application file for complete search history.

(56) References Cited

U.S. PATENT DOCUMENTS

| | | | | |
|---|---|---|---|---|
| 4,608,688 A * | 8/1986 | Hansen et al. ................. | 714/6.2 |
| 4,755,928 A * | 7/1988 | Johnson et al. ............. | 714/38.14 |
| 4,888,686 A * | 12/1989 | Sinz et al. ..................... | 711/162 |
| 5,051,887 A * | 9/1991 | Berger et al. ................. | 711/162 |
| 5,146,605 A * | 9/1992 | Beukema et al. ................. | 710/1 |
| 5,155,845 A * | 10/1992 | Beal et al. .................... | 714/6.12 |
| 5,175,837 A * | 12/1992 | Arnold et al. ................. | 711/152 |
| 5,206,939 A * | 4/1993 | Yanai et al. ........................ | 711/4 |
| 5,208,665 A * | 5/1993 | McCalley et al. ............. | 725/119 |
| 5,666,538 A * | 9/1997 | DeNicola ...................... | 713/320 |
| 5,987,621 A * | 11/1999 | Duso et al. .................... | 714/4.11 |
| 6,018,765 A * | 1/2000 | Durana et al. ................. | 709/217 |
| 6,557,123 B1 * | 4/2003 | Wiencko et al. .............. | 714/701 |
| 6,785,788 B1 * | 8/2004 | Sands, III ..................... | 711/162 |
| 7,058,826 B2 * | 6/2006 | Fung ............................. | 713/300 |
| 7,389,396 B1 * | 6/2008 | Goel et al. .................... | 711/167 |
| 7,739,299 B2 * | 6/2010 | Kii et al. ....................... | 707/781 |
| 2003/0097443 A1 * | 5/2003 | Gillett et al. .................. | 709/225 |
| 2003/0126315 A1 * | 7/2003 | Tan et al. .......................... | 710/1 |
| 2003/0159085 A1 * | 8/2003 | Allen et al. ..................... | 714/15 |
| 2003/0163509 A1 * | 8/2003 | McKean et al. .............. | 709/100 |
| 2003/0163655 A1 * | 8/2003 | McKean et al. .............. | 711/154 |
| 2004/0024962 A1 * | 2/2004 | Chatterjee et al. ............ | 711/114 |

(Continued)

FOREIGN PATENT DOCUMENTS

JP    2000-330732    11/2000

(Continued)

OTHER PUBLICATIONS

Japanese Office Action, English-language Translation mailed May 10, 2011 for corresponding Japanese Application No. 2006-048597.

*Primary Examiner* — Ario Etienne
*Assistant Examiner* — Sargon Nano
(74) *Attorney, Agent, or Firm* — Fujitsu Patent Center (57) ABSTRACT

A plurality of storage nodes are connected via a network to build a storage system. Each of the storage nodes includes a storage device. A condition holding unit holds a state condition indicating an inactive state and an active state of the storage device. A state control unit controls a state of the storage device between the inactive state and the active state based on the state condition held by the condition holding unit.

4 Claims, 6 Drawing Sheets

U.S. PATENT DOCUMENTS

| | | | |
|---|---|---|---|
| 2004/0193737 A1* | 9/2004 | Huffman et al. | 710/1 |
| 2005/0050392 A1* | 3/2005 | Baba et al. | 714/25 |
| 2005/0160308 A1* | 7/2005 | Elcock et al. | 714/5 |
| 2006/0069892 A1* | 3/2006 | Nakanishi et al. | 711/162 |
| 2006/0206662 A1* | 9/2006 | Ludwig et al. | 711/114 |
| 2006/0248561 A1* | 11/2006 | Hashimoto et al. | 725/100 |
| 2007/0074263 A1* | 3/2007 | Shimazu | 725/132 |

FOREIGN PATENT DOCUMENTS

| | | |
|---|---|---|
| JP | 2001-350685 A | 12/2001 |
| JP | 2002-132531 A | 5/2002 |
| JP | 2003-263374 A | 9/2003 |
| JP | 2005-071119 A | 3/2005 |

* cited by examiner

FIG.3

| STATE-CONDITION TABLE | | |
|---|---|---|
| TIME | INACTIVE STATE | ACTIVE STATE |
| 0 TO 4 | DISK 1, DISK 2 ··· | DISK 5, DISK 6 ··· |
| 4 TO 8 | ··· | ··· |
| 8 TO 12 | ··· | ··· |
| 12 TO 16 | ··· | ··· |
| ··· | ··· | ··· |

FIG.4

| REQUEST | FLAG (1: YES 0: NO) |
|---|---|
| WRITIE REQUEST TO OWN DISK (INCLUDING MANAGEMENT INFORMATION FROM OTHER DISK) | MW: 1 OR 0 |
| READ REQUEST TO OWN DISK (INCLUDING SEARCH RETRIEVING) | MR: 1 OR 0 |
| WRITE REQUEST TO OTHER DISK | OW: 1 0R 0 |
| READ REQUEST TO OTHER DISK (SEARCH RETRIEVING) | OR: 1 OR 0 |
| REQUEST FOR CHANGING INACTIVE STATE | SR: 1 OR 0 |

FIG.5

| INTERNAL STATE | FLAG (1: YES 0: NO) |
|---|---|
| WRITING DATA ADDRESSED TO OWN DISK | MWD: 1 OR 0 |
| WRITING MANAGEMENT DATA OF OTHER DISK DEVICE | OWI: 1 OR 0 |
| WRITING DATA ADDRESSED TO OTHER DISK | OWD: 1 OR 0 |
| READING OUT DATA OR SEARCH INFORMATION FROM OWN DISK | MRD: 1 OR 0 |
| READING OUT SEARCH INFORMATION OF OTHER DISK DEVICE | ORI: 1 OR 0 |
| INACTIVE STATE | SLP: 1 OR 0 |
| HOLD DATA OF OTHER DISK | ODH: 1 OR 0 |

FIG.6

STORAGE SYSTEM

BACKGROUND OF THE INVENTION

1. Field of the Invention

The present invention relates to a storage system configured by connecting a plurality of storage nodes each of which having a storing device via a network.

2. Description of the Related Art

With the increase of using digital data and the increase of a demand for storing large amount of archived data, a storage device that performs operations concurrently for a plurality of disk devices has become popular (see, for example, Japanese Patent Application Laid-Open No. 2000-330732). The storage device includes a plurality of storage nodes containing a controller and a plurality of magnetic disk devices controlled by the controller, connected via a network, thereby realizing a higher capacity of data storage. On the other hand, because the storage device uses a lot of magnetic disk devices, there has been a problem that power consumption becomes higher. Generally, the power consumption has been reduced by changing operating state of the magnetic disk devices to be in standby state when the magnetic disk devices do not receive an access request such as a read request or a write request for a certain time period.

However, with the conventional technology, it is difficult to simultaneously realize maximizing access efficiency and reducing power consumption. Namely, when a higher priority is put on maximizing access efficiency, the magnetic disk devices in the storage device cannot be set in the standby state (e.g., a motor needs to be rotating even if a head is unloaded so as to keep a condition for receiving an access). Therefore it is difficult to simultaneously realize maximizing access efficiency and reducing power consumption.

SUMMARY OF THE INVENTION

It is an object of the present invention to at least partially solve the problems in the conventional technology.

A storage system according to one aspect of the present invention includes a plurality of storage nodes connected via a network to build the storage system, each of the storage nodes including a storage device; a condition holding unit that holds a state condition indicating an inactive state and an active state of the storage device; and a state control unit that controls a state of the storage device between the inactive state and the active state based on the state condition held by the condition holding unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below.

Figure 1:
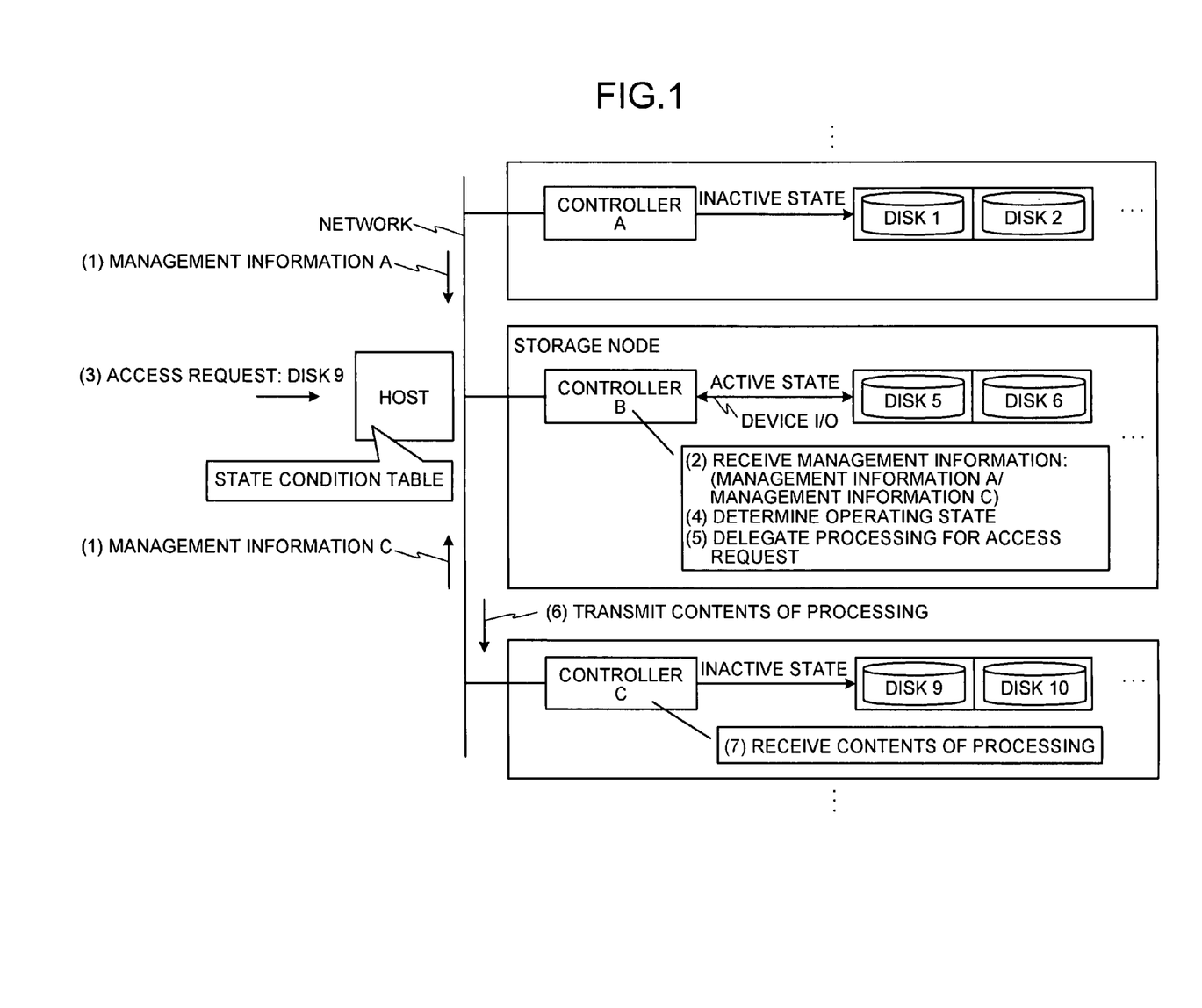
FIG. 1 is a schematic for explaining the concept of a storage system according to an embodiment of the present invention.

FIG. 1 is a schematic for explaining the concept of a storage system according to an embodiment of the present invention. The storage system is configured by connecting a plurality of storage nodes, each includes a plurality of disks (e.g., a storage device such as a magnetic disk device) and a controller therein, with a host via a network (e.g., local area network (LAN) such as Ethernet), and receives an access request (e.g., a read request and a write request) from a higher-level device (e.g., a client computer used by a user). The storage system is advantageous to simultaneously realize maximizing access efficiency and reducing power consumption.

As shown in FIG. 1, the host that controls controllers (e.g., controllers A, B, and C) provided one-to-one in the storage nodes contains a state-condition table. The state-condition table determines state condition of disks to be in an inactive state or to be in an active state, so as to allocate the inactive state to disks (e.g., a disk 1 and 2) and allocate the active state to other disks (e.g., a disk 5 and 6) among the storage nodes. In other words, by controlling the state condition of the disks to be in the inactive state or to be in the active state among the storage nodes, it becomes effective to reduce power consumption.

When the controller A and the controller C receive a command from the host based on the state-condition table for controlling disks (e.g., disks 1, 2, 9 and 10) to be in the inactive state, the controller A and the controller C transmit management information A and management information C (e.g., index information frequently retrieved by a user, in the case of broadcasting data), respectively, to the controller B that controls the disks (e.g., disks 5 and 6) in the active state (see, FIG. 1 (1)). The controller B receives the management information A and the management information C, and stores the management information A and the management information C to the own disks (e.g., disks 5 and 6) (see, FIG. 1 (2)).

Figure 4:
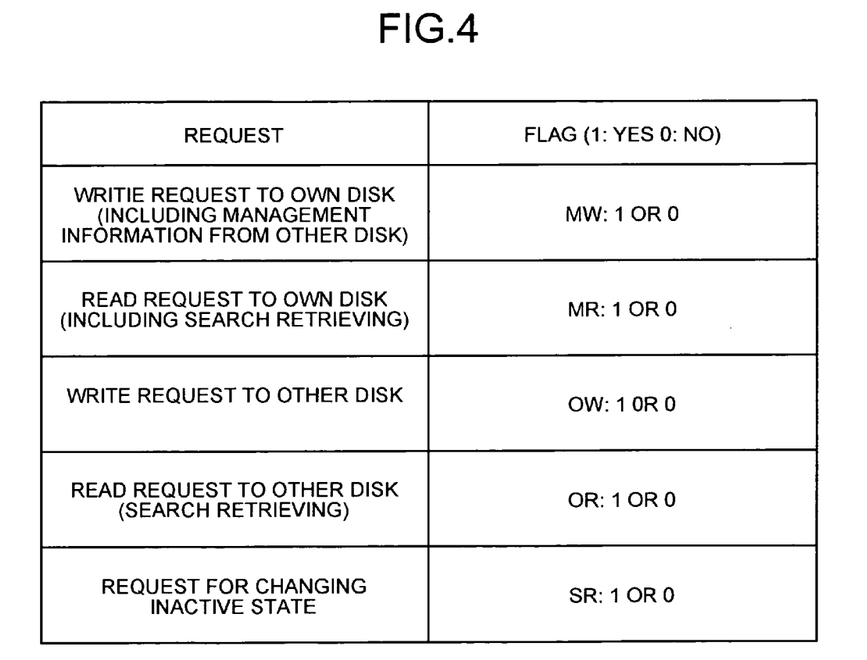
FIG. 4 is an example of the contents of a table of a request to be accepted by a controller shown in FIG. 2.

When the host receives an access request from a higher-level device (see, FIG. 1 (3)), the host transmits the access request to the controller B that controls the disks (e.g., disks 5 and 6) in the active state. The controller B receives the access request from the host and determines operating state. More specifically, as shown in FIG. 4, the controller B determines whether the received access request corresponds to a write request to an own disk controlled by an own controller (MW), a read request to the own disk (MR), a write request to other disk controlled by other controller (OW), a read request of search information to the other disk (OR), or a request of changing inactive state (SR), and changes own internal state according to the request.

When the access request is, for example, OW or OR, the controller B delegates processing of the access request for other controllers (see, FIG. 1 (5)). Namely, it is effective not to degrade access efficiency for accessing data stored in the disks. For example, when the access request is a read request of search information addressed to the other disk (e.g., a request of reading data stored in the disk 9 controlled by the controller C), the controller B retrieves management information corresponding to the disk 9 in the inactive state from the own disk 5 or 6 and transmits the management information to a request source.

When the access request is a write request to the other disk (e.g., a request of writing data to the disk 9 controlled by the controller C), the controller B writes data related to the request to the own disk 5 or 6 and temporarily stores the data therein. Thereafter, when a predetermined transmission condition (e.g., predetermined time for a transmission or a memory capacity of a storage device) is met, the controller B transmits the temporarily stored data to the controller C that controls the disk 9 (see, FIG. 1 (6)). The controller C receives the data from the controller B (see, FIG. 1 (7)), and writes the data to the disk 9 as originally designated. With the storage system according to the present embodiment, it is effective to maximize the access efficiency and at the same time reduce the power consumption.

Figure 2:
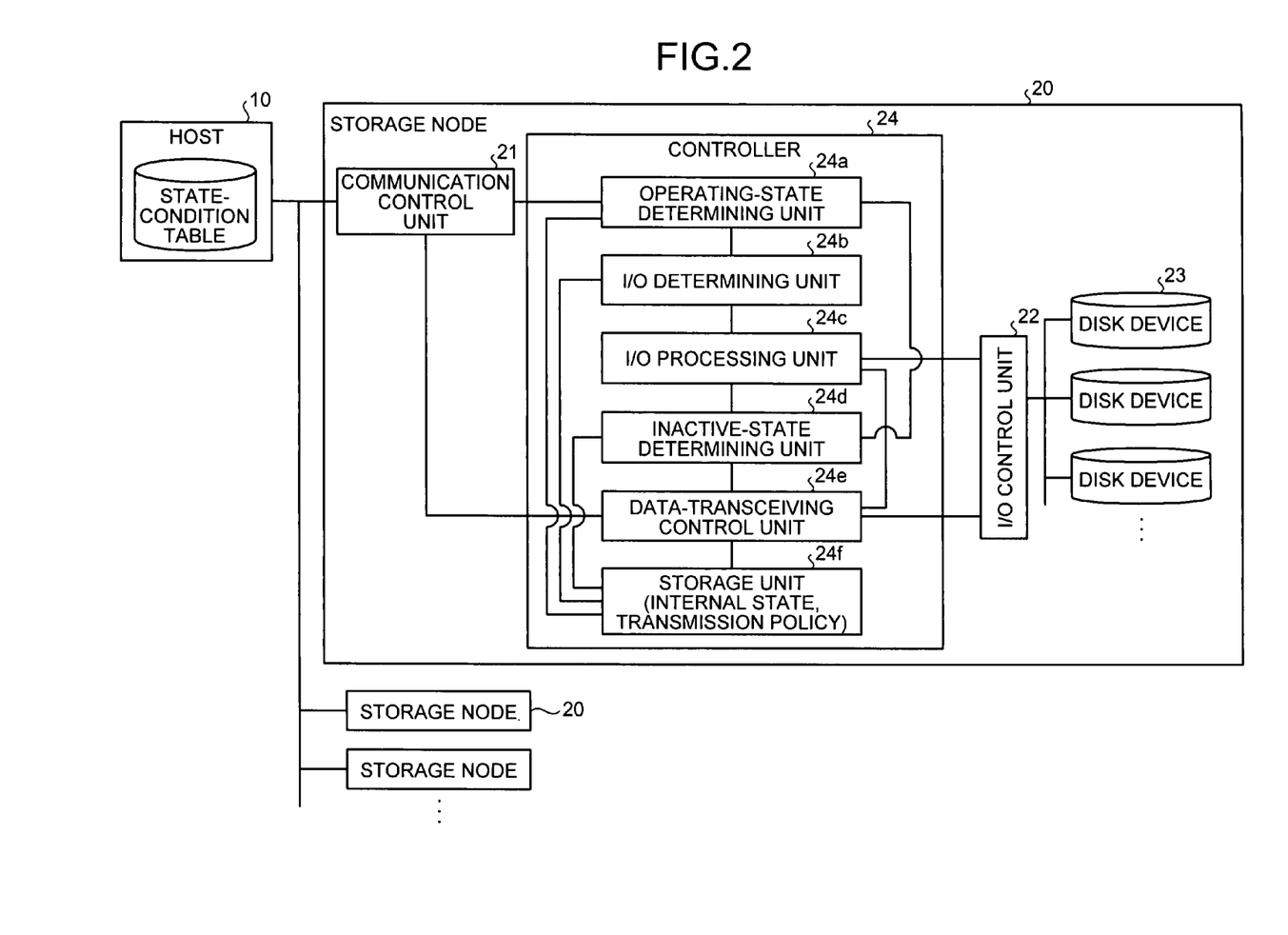
FIG. 2 is a block diagram for explaining a structure of the storage system shown in FIG. 1.
Figure 3:
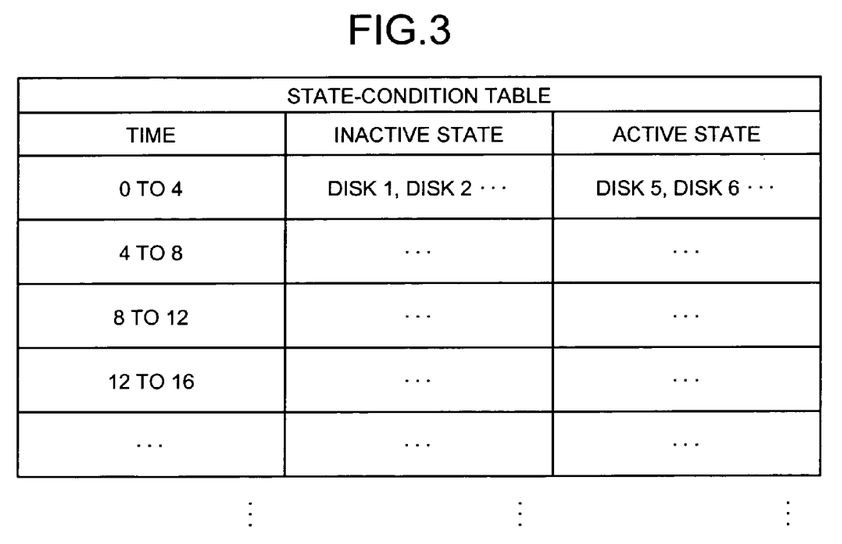
FIG. 3 is an example of the contents of a state-condition table.

FIG. 2 is a block diagram for explaining a structure of the storage system shown in FIG. 1. The storage system includes a host 10 and a plurality of storage nodes 20, and is configured by connecting the host 10 with the storage nodes 20 via a network (e.g., LAN such as Ethernet). The host 10 is a control unit that controls a controller 24 provided in the storage node 20, and includes a state-condition table shown in FIG. 3, in which a state condition of the inactive state and the active state of a disk is determined so as to allocate the inactive state to the disks (e.g., the disk 1 and 2) and to allocate the active state to the other disks (e.g., the disk 5 and 6) among the storage nodes. The host 10 sends out a command to the controller 24 based on the state-condition table for controlling an operating state of a disk device 23 to be in the inactive state or to be in the active state.

The storage node 20 includes a communication control unit 21, an input/output (I/O) control unit 22, the disk device 23, and the controller 24. The communication control unit 21 controls communication related to various information transmitted and received between the host 10 and the storage node 20 or transmitted and received among the storage nodes 20. More specifically, the communication control unit 21 controls communication related to a command or an access request sent from the host 10 to the controller 24 for controlling the operating state of the disk device 23 to be in the inactive state or to be in the active state, or communication related to the management information of the disk device 23 (e.g., index information frequently retrieved by a user, in the case of broadcasting data).

The I/O control unit 22 controls data input and output between a plurality of disk devices 23 and the controller 24, and more specifically, controls data related to an I/O processing by using a connection standard such as small computer system interface (SCSI), or AT attachment (ATA). The disk device 23 is a storing unit that stores data necessary for various processing performed by the controller 24. More specifically, the disk device 23 temporarily stores, for example, management information of other disk devices 23.

The controller 24 includes an internal memory for storing predetermined control programs, other programs that provides various operation procedures, and necessary data, and performs various processing according to the programs and the data. Particularly, the controller 24 includes an operating-state determining unit 24a, an I/O determining unit 24b, an I/O processing unit 24c, an inactive-state determining unit 24d, a data-transceiving control unit 24e, and a storing unit 24f in relation to the present invention.

Figure 5:
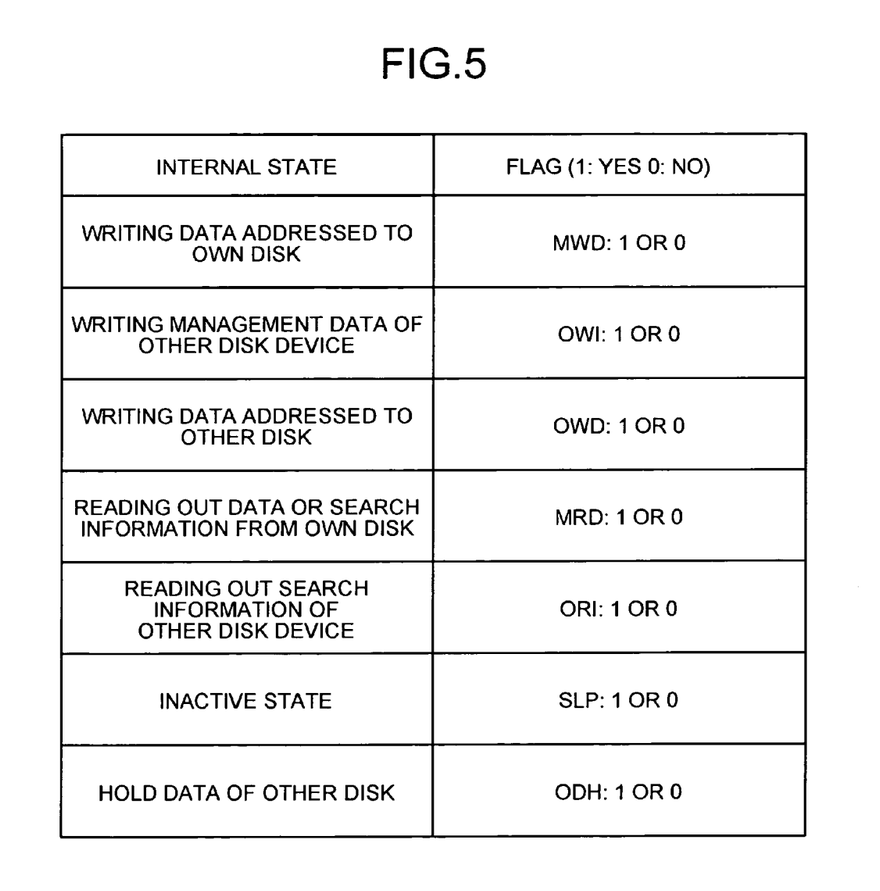
FIG. 5 is an example of the contents of an internal-state table for the controller.

The operating-state determining unit 24a determines predetermined contents of a request received from the host 10 and changes the operating state, particularly, an internal state of the controller 24 according to the request. As shown in FIG. 4, the contents of a request is determined as a write request to an own disk controlled by an own controller (MW), a read request to the own disk (MR), a write request to other disk controlled by other controller (OW), a read request of search information to the other controller (OR), and a request of changing inactive state (SR), and when a request corresponds to any one or many of the above contents, corresponding flag is changed from 0 to 1. The internal state of a disk is determined as shown in FIG. 5 as writing data to the own disk (MWD), writing managing data to the other disk (OWI), writing data to the other disk (OWD), reading data and search from the own disk (MRD), reading search from the other disk (ORI), self-inactive state (SLP), and holding data addressed to other disk (ODH), and when any one or many of the internal state corresponds to the request sent from the host 10, corresponding flag is changed from 0 to 1.

For example, when the operating-state determining unit 24a receives requests corresponding to MW, MR, OW, and OR from the host 10, the operating-state determining unit 24a sends out a processing command to the I/O determining unit 24b, and when receiving a request corresponding to SR, the operating-state determining unit 24a sends out a processing command to the inactive-state determining unit 24d. The internal state is stored in the storing unit 24f and a default setting of the flag in an internal-state table shown in FIG. 5 is 0.

The I/O determining unit 24b determines a change of the internal state performed by the operating-state determining unit 24a. More specifically, the I/O determining unit 24b reads out the internal-state table from the storing unit 24f and determines the internal state based on the flags corresponding to the symbols other than SLP in the internal-state table. Namely, when any one or many of the flags is 1, it is determined that a disk is in the internal state corresponding to the flags.

The I/O processing unit 24c performs an input and output processing based on a result determined by the I/O determining unit 24b. The I/O processing unit 24c reads out the internal-state table from the storing unit 24f, and when the flag corresponding to MWD is 1, the I/O processing unit 24c writes data to the own disk device 23. (When the storage node 20 is in the inactive state and receives data transmitted from the other storage node 20 in the same storage system, the I/O processing unit 24c changes the operating state to the active state on a temporary basis and writes the data to the own disk device 23.) Alternately, when the flag corresponding to OWI is 1, the I/O processing unit 24c writes management information received from the other inactive disk device 23 to the own disk device 23. When the flag corresponding to OWD is 1, the I/O processing unit 24c writes data, designated to be written to the other inactive disk device 23, to the own disk device 23. When the flag corresponding to MRD is 1, the I/O processing unit 24c reads out data or search information from the own disk device 23. When the flag corresponding to ORI is 1, the I/O processing unit 24c reads out search information of the other inactive disk device 23 temporarily stored in the own disk device 23. When the flag corresponding to ODH is 1, and if the transmission policy (e.g., predetermined time for a transmission or a memory capacity of a storage device) retrieved from the storing unit 24f is met, the I/O processing unit 24c sends out a command to the data-transceiving control unit 24e for transmitting data temporarily stored in the own disk device 23, yet designated to be written to the other disk device 23 in the other storage node 20.

The I/O processing unit 24c changes the flag from 1 to 0 in the internal-state table after the I/O processing based on the result determined by the I/O determining unit 24b terminates. The inactive-state determining unit 24d changes the operating state of the own disk device 23 to be in the inactive state or to be in the active state. More specifically, when receiving a request of changing an inactive state from the host 10 (e.g., when the flag corresponding to SR shown in FIG. 1 is 1), the inactive-state determining unit 24d reads out the internal-state table from the storing unit 24f and verifies that the flag corresponding to SLP is 1. When the flag corresponding to SLP is 1, the inactive-state determining unit 24d changes the operating state of the own disk device 23 from the inactive state to the active state and changes the flag corresponding to SLP from 1 to 0. On the contrary, when the flag corresponding to SLP is 0, the inactive-state determining unit 24d sends out a command to the data-transceiving control unit 24e for transmitting the own management information to the other active disk device 23. The inactive-state determining unit 24d also deletes the management table of the other disk device 23 temporarily stored in the own disk device 23, and changes the operating state from the active state to the inactive state and also changes the flag corresponding to the SLP from 0 to 1.

The data-transceiving control unit 24e controls data transmitting and data receiving. More specifically, the data-transceiving control unit 24e stores the managing data received from the other inactive disk device 23 via the communication control unit 21 (e.g., index information frequently retrieved by a user, in the case of broadcasting data) into the own disk device 23, and receives the command from the I/O processing unit 24c, thereby transmitting data temporarily stored in the own disk device 23 to the other disk device 23 originally designated to store the data. When transmitting the management information to the other inactive disk device 23, the management information can be received by the storage node 20 containing the inactive disk device 23 by attaching a tag, with which the inactive disk device can react, to the management information to be transmitted. The storing unit 24f stores data and programs necessary for operating various processings by the controller 24. The storing unit 24f stores therein, for example, the internal-state table for the controller 24 and a transmission policy of a condition for transmitting data to the other inactive disk device 23.

Figure 6:
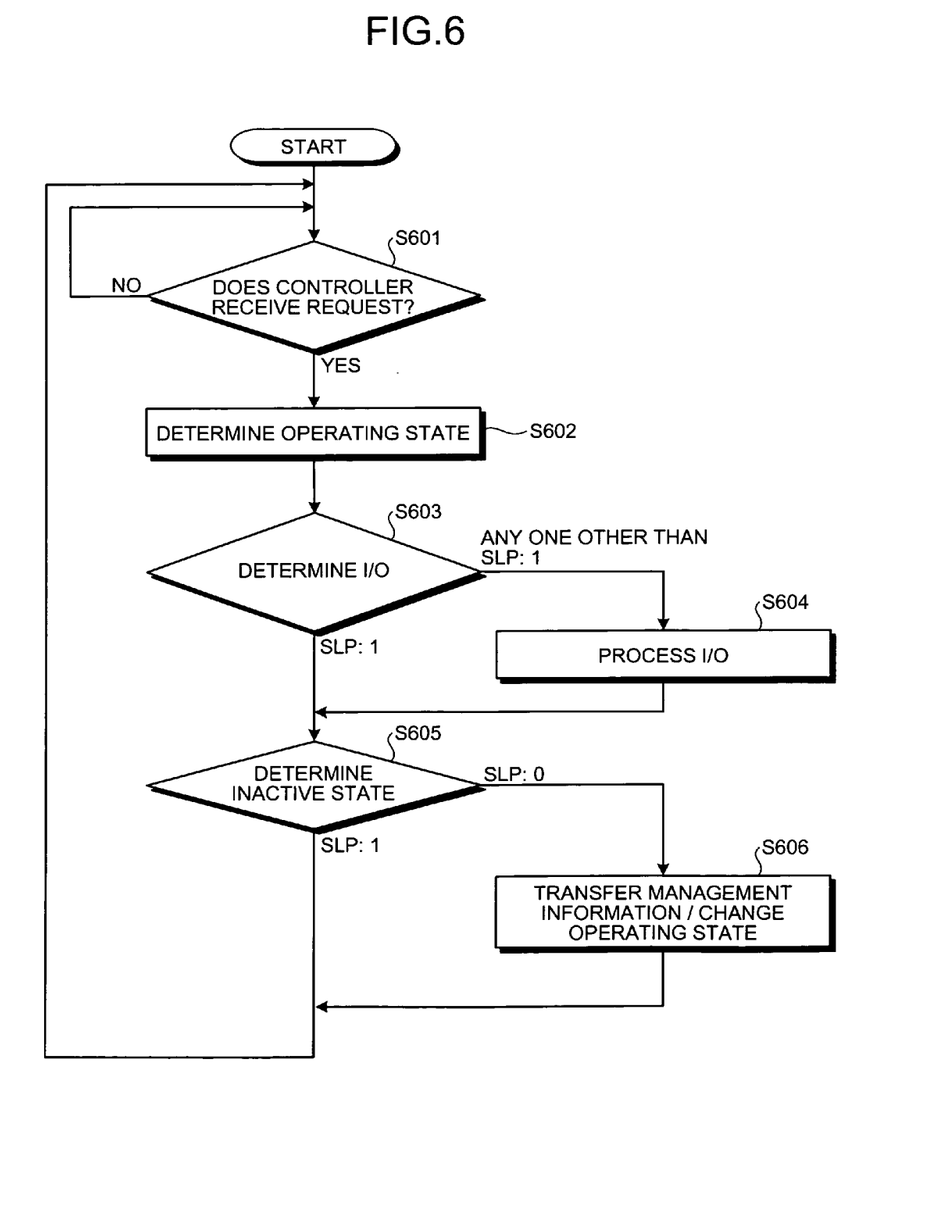
FIG. 6 is a flowchart for explaining an operation procedure of the controller.

FIG. 6 is a flowchart for explaining an operation procedure of the storage system (the controller 24). Upon receiving a request from the host 10 (YES at step S601), the operating-state determining unit 24a in the controller 24 determines the operating state (step S602). Namely, the operating-state determining unit 24a determines whether the received request is a write request to the own disk, a read request to the own disk, a write request to the other disk, a search request (read information) to the other disk, or a request of changing inactive state, and changes the internal-state table based on the received request.

The I/O determining unit 24b determines whether the operating state determining unit 24a receives a request based on the change in the internal-state table (step S603). The I/O determining unit 24b reads the internal-state table from the storing unit 24f and determines a internal state of a disk based on the flags except a flag corresponding to SLP (e.g., it is determined that a disk is in the internal state corresponding to a flag that is 1).

When any one or many of the flags other than the flag corresponding to SLP is 1, the I/O processing unit 24c performs processing based on the determined result (step S604). More specifically, the I/O processing unit 24c reads out the internal-state table from the storing unit 24f, and when a flag corresponding to MWD is 1, the I/O processing unit 24c writes data to the own disk device 23. (When the storage node 20 is in the inactive state and receives data transmitted from the other storage node 20 in the same storage system, the I/O processing unit 24c changes the operating state to the active state on a temporary basis and writes the data to the own disk device 23.) Alternately, when a flag corresponding to OWI is 1, the I/O processing unit 24c writes management information received from the other inactive disk device 23 to the own disk device 23. When a flag corresponding to OWD is 1, the I/O processing unit 24c writes data designated to be written in the other inactive disk device 23 to the own disk device 23. When a flag corresponding to MRD is 1, the I/O processing unit 24c reads data or other information from the own disk device 23. When a flag corresponding to ORI is 1, the I/O processing unit 24c reads search information temporarily stored in the own disk device 23 for the other inactive disk device 23. When a flag corresponding to ODH is 1, and if the transmission policy (e.g., predetermined time for a transmission or a memory capacity of a storage device) retrieved from the storing unit 24f is met, the I/O processing unit 24c sends out a command to the data-transceiving control unit 24e for transmitting data, temporarily stored in the own disk device 23, yet designated to be written to the other disk device 23 in the other storage node 20, to the other disk device 23. On the contrary, when any one or many of the flags other than the flag corresponding to SLP is 0, the process control proceeds to step S605.

When a flag corresponding to SLP is 1, the inactive-state determining unit 24d performs inactive-state determining processing for changing the operating state of the own disk device 23 to be in the inactive state or to be in the active state (step S605). When the flag corresponding to SLP is 1, the inactive-state determining unit 24d changes the operating state of the own disk device 23 to be in the active state and also changes the flag corresponding to the SLP to 0. Alternately, when the flag corresponding to SLP is 0, the inactive-state determining unit 24d sends out a command to the data-transceiving control unit 24e for transmitting own management information to the other active disk device 23, deletes management information of the other disk device 23 temporarily stored in the own disk device 23, changes the operating state of the own disk device 23 to be in the inactive state, and changes the flag corresponding to SLP to 1 (step S606).

According to the present embodiment, the storage system includes a state condition of the inactive state or the active state so as to allocate the inactive state to a disk and to allocate the active state to another disk among the storage nodes (e.g., set a time period for being in the inactive state or being in the active state with respect to each disk device), and controls the operating state of the disk device provided in the storage nodes to be in the inactive state or to be in the active state based on the state condition. Therefore, an active disk device can be determined for receiving a read access or a write access and the other disk devices can be set in the inactive state for a certain time period. As a result, it becomes possible to maximize access efficiency and at the same time to reduce a power consumption.

Furthermore, according to the present embodiment, the active storage node in the storage system delegates a processing operation of an access request sent to the other inactive disk devices. Therefore, it becomes possible to reply to the access request sent to the other inactive disk devices. As a result, it becomes possible to maximize access efficiency and at the same time to reduce a power consumption.

Moreover, according to the present embodiment, the active storage node in the storage system receives data, stored in the other disk device and frequently retrieved by a user (e.g., index information frequently retrieved by a user, in the case of broadcasting data), from the other inactive disk device, and stores the data therein. Thereafter, when receiving a request of reading data stored in the other inactive disk device, the storage node reads out data corresponding to the request and transmits the data to the requested source. Therefore, it becomes possible to reply to the request of reading data for the inactive disk device. As a result, it becomes possible to maximize access efficiency and at the same time to reduce a power consumption.

Furthermore, according to the present embodiment, when receiving a request of writing data to the other inactive disk device, the active storage node in the storage system temporarily stores the data corresponding to the request therein. Thereafter, when the predetermined transmission condition (e.g., predetermined time for a transmission or a memory capacity of a storage device) is met, the active disk device transmits the data temporarily stored therein to the other disk device originally designated to write the data thereto. Therefore, it becomes possible to reply to the request of writing data to the other inactive disk device. As a result, it becomes possible to maximize access efficiency and at the same time to reduce a power consumption.

The present invention is not limited to the above explained embodiment and can be applied to the other embodiments. Some operation processing is explained as automatically performed in the present embodiment. However, all the operation processing or part of the operation processing can be manually performed. Alternately, some operation processing is explained as manually performed in the present embodiment. However, all the operation processing or part of the operation processing can be automatically performed. The operation processing, the control processing, descriptions of devices, operations, and the like, and information including various data and parameters can be arbitrarily changed unless otherwise specified.

Each component included in the storage node 20 shown in FIG. 2 is functional and conceptual. Therefore it is not necessary to be configured as shown in FIG. 2. Namely, detailed configuration for distributing or integrating the storage node system and the storage node 20 is not limited to the above embodiment. The host 10 and the storage node 20 can be integrated so that the controller 24 provided in the storage node 20 controls the operating state of the disk device 23 to be in the inactive state or to be in the active state. Alternately, the operating-state determining unit 24a, the I/O determining unit 24b, and the I/O processing unit 24c can be integrated. As described above, the components can be arbitrarily distributed and integrated functionally or physically. In the operation processing performed by each component, all or arbitral part can be realized by a CPU and a program analyzed and performed by the CPU, or can be realized as hardware based on a wired logic.

The operation procedure according to the storage system explained in the present embodiment (see, FIG. 6) can be realized by executing a predetermined program by a computer such as a personal computer or a workstation. The program can be stored in such a computer readable recording medium as a hard disk, a flexible disk (FD), compact disk read only memory (CD-ROM), a magneto optical (MO) disk, and a digital versatile disk (DVD), and can be read by a computer for performing the operation procedure.

According to an embodiment of the present invention, the storage system includes a state condition of the inactive state or the active state so as to allocate the inactive state to a disk device and allocate the active state to the another disk device among the storage nodes (e.g., set a time period for being in the inactive state or being in the active state with respect to the disk device), and controls the operating state of the disk device provided in the storage nodes to be in the inactive state or to be in the active state based on the state condition. Therefore, an active disk device can be determined for receiving a read access or a write access and the other disk devices can be set in the inactive state for a certain time period. As a result, it becomes possible to maximize access efficiency and at the same time to reduce a power consumption.

Furthermore, according to an embodiment of the present invention, the active storage node in the storage system delegates a processing operation of an access request sent to the other inactive disk device. Therefore, it becomes possible to reply to the access request sent to the other inactive disk device. AS a result, it becomes possible to maximize access efficiency and at the same time to reduce a power consumption.

Moreover, according to an embodiment of the present invention, the active storage node in the storage system receives data, stored in the other disk device and frequently retrieved by a user (e.g., index information, in the case of broadcasting data), from the other inactive disk device, and stores the data therein. Thereafter, when receiving a request of reading data stored in the other inactive disk device, the storage node reads out data corresponding to the request and transmits the data to the requested source. Therefore, it becomes possible to reply to the request of reading data for the inactive disk device. As a result, it becomes possible to maximize access efficiency and at the same time to reduce a power consumption.

Furthermore, according to an embodiment of the present invention, when receiving a request of writing data to the other inactive disk device, the active storage node in the storage system temporarily stores the data corresponding to the request therein. Thereafter, when the predetermined transmission condition (e.g., predetermined time for a transmission or a memory capacity of a storage device) is met, the active disk device transmits the data temporarily stored therein to the other disk device originally designated to write the data thereto. Therefore, it becomes possible to reply to the request of writing data to the other inactive disk device. As a result, it becomes possible to maximize access efficiency and at the same time to reduce a power consumption.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage system comprising:
   a first storage node and a second storage node that are connected to each other,
   the first storage node including:
     a first storage unit that stores data; and
     a controller that controls the first storage unit to be in either an active state or an inactive state, according to a state condition indicating allocation of the inactive state and the active state to the first storage node and the second storage node, respectively;
   the second storage node including:
     a second storage unit that stores data;
     a determining unit that determines the second storage unit to be in either the inactive state or the active state according to the state condition;
     an I/O processing unit that processes an access request transmitted to the first storage node, in place of the controller in the first storage node, by writing data to or reading data from the second storage unit, when the second storage unit is in the active state; and a transmitting unit that transmits management information of the second storage node to the first storage node in the inactive state, deletes management information of the first storage unit temporarily stored in the second storage unit, changes the operating state of the second storage unit to be in the inactive state, and changes into a flag corresponding to a self-inactive state (SLP) indicating the inactive state 0, when the flag indicates the active state 1.

2. The storage system according to claim 1, wherein the I/O processing unit reads out, when there is a read-out request to the first storage unit, data corresponding to the read-out request from the second storage unit, and transmits the read data to a request source of the read-out request.

3. The storage system according to claim 1, wherein the controller makes the first storage unit store the management information transmitted from the second storage node.

4. The storage system according to claim 1, wherein the management information is index information that is frequently retrieved by a user.

* * * * *